United States Patent
Teng et al.

(10) Patent No.: US 9,520,731 B2
(45) Date of Patent: Dec. 13, 2016

(54) CONTROL METHOD FOR CLEANING ROBOTS

(71) Applicant: Micro-Star International Company Limited, New Taipei (TW)

(72) Inventors: You-Wei Teng, New Taipei (TW); Yi-Chih Yeh, New Taipei (TW); Shih-Che Hung, Hsinchu (TW)

(73) Assignee: MSI COMPUTER (SHENZHEN) CO., LTD., Shenzhen (CN)

( * ) Notice: Subject to any disclaimer, the term of this patent is extended or adjusted under 35 U.S.C. 154(b) by 801 days.

(21) Appl. No.: 13/768,546

(22) Filed: Feb. 15, 2013

(65) Prior Publication Data

US 2013/0214727 A1 Aug. 22, 2013

Related U.S. Application Data

(60) Provisional application No. 61/599,690, filed on Feb. 16, 2012.

(30) Foreign Application Priority Data

Sep. 25, 2012 (TW) .............................. 101135041 A (51) Int. Cl.
*H02J 7/00* (2006.01)
*G05D 1/02* (2006.01)

(52) U.S. Cl.
CPC ........... *H02J 7/0052* (2013.01); *G05D 1/0242* (2013.01); *A47L 2201/022* (2013.01);
(Continued)

(58) Field of Classification Search
CPC ............. A47L 2201/02; A47L 2201/04; A47L 2201/022; G01J 5/028; G05D 1/0225; G05D 1/0234; G05D 1/0255; G05D 2201/0215; G05D 1/0242; G05D 2201/0203; H02J 7/0052
See application file for complete search history.

(56) References Cited

U.S. PATENT DOCUMENTS

2005/0230166 A1* 10/2005 Petersson ............. A01D 34/008
180/170
2005/0231156 A1 10/2005 Yan
(Continued)

FOREIGN PATENT DOCUMENTS

CN 102262407 A 11/2011
TW 200536230 A 11/2005
(Continued)

*Primary Examiner* — Nha Nguyen
(74) *Attorney, Agent, or Firm* — Birch, Stewart, Kolasch & Birch, LLP (57) ABSTRACT

An embodiment of the invention provides a charging station for a cleaning robot. The charging station includes an IR transmitter and a controller. The IR transmitter outputs a first IR light beam, wherein the IR light beam includes a second boundary and a first boundary which is substantially perpendicular or perpendicular to the charging station and the cleaning robot moves to the charging station along the first boundary. The controller controls the IR transmitter to output the first IR light beam or a second IR light beam. When the controller determines that the cleaning robot is near to the charging station, the controller controls the IR transmitter to output the second IR light beam.

16 Claims, 7 Drawing Sheets

(52) U.S. Cl.
CPC .. *A47L 2201/04* (2013.01); *G05D 2201/0203* (2013.01); *G05D 2201/0215* (2013.01)

(56) References Cited

U.S. PATENT DOCUMENTS

| | | |
|---|---|---|
| 2006/0074558 A1 | 4/2006 | Williamson et al. |
| 2007/0016328 A1 | 1/2007 | Ziegler et al. |
| 2007/0233319 A1* | 10/2007 | Im ................... G05D 1/0225 700/245 |
| 2008/0009984 A1 | 1/2008 | Lee et al. |
| 2008/0051953 A1 | 2/2008 | Jones et al. |
| 2008/0161969 A1 | 7/2008 | Lee et al. |
| 2010/0324736 A1* | 12/2010 | Yoo .................. G05D 1/0225 700/259 |
| 2011/0241616 A1* | 10/2011 | Kim ................... H02J 7/025 320/108 |

FOREIGN PATENT DOCUMENTS

| | | |
|---|---|---|
| TW | 200836897 A | 9/2008 |
| TW | I305610 B | 1/2009 |
| TW | I330305 B | 9/2010 |

* cited by examiner

CONTROL METHOD FOR CLEANING ROBOTS

CROSS REFERENCE TO RELATED APPLICATIONS

This application claims the benefit of U.S. Provisional Application No. 61/599,690 filed Feb. 16, 2012, the entirety of which is incorporated by reference herein.

This Application claims priority of Taiwan Patent Application No. 101135041, filed on Sep. 25, 2012, the entirety of which is incorporated by reference herein.

BACKGROUND OF THE INVENTION

Field of the Invention

The invention relates to a cleaning robot, and more particularly, to a cleaning robot with a non-omni light detector.

Description of the Related Art

A variety of movable robots, which generally include a driving means, a sensor and a travel controller, and perform many useful functions while autonomously operating, have been developed. For example, a cleaning robot for the home is a cleaning device that sucks dust and dirt from the floor of a room while autonomously moving around the room without user manipulation.

BRIEF SUMMARY OF THE INVENTION

An embodiment of the invention provides a charging station for a cleaning robot. The charging station comprises an IR transmitter and a controller. The IR transmitter outputs a first IR light beam, wherein the IR light beam comprises a second boundary and a first boundary which is substantially perpendicular or perpendicular to the charging station and the cleaning robot moves to the charging station along the first boundary. The controller controls the IR transmitter to output the first IR light beam or a second IR light beam. When the controller determines that the cleaning robot is near to the charging station, the controller controls the IR transmitter to output the second IR light beam.

Another embodiment of the invention provides a charging system comprising a charging station and a cleaning robot. The charging station comprises an IR transmitter and a controller. The IR transmitter outputs a first IR light beam, wherein the IR light beam comprises a second boundary and a first boundary which is substantially perpendicular or perpendicular to the charging station. The controller controls the IR transmitter to output the first IR light beam or a second IR light beam. The cleaning robot comprises a light detector to detect the first IR light beam or the second IR light beam. When the light detector detects the first IR light beam or the second IR light beam, the cleaning robot moves to the charging station along the first boundary.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
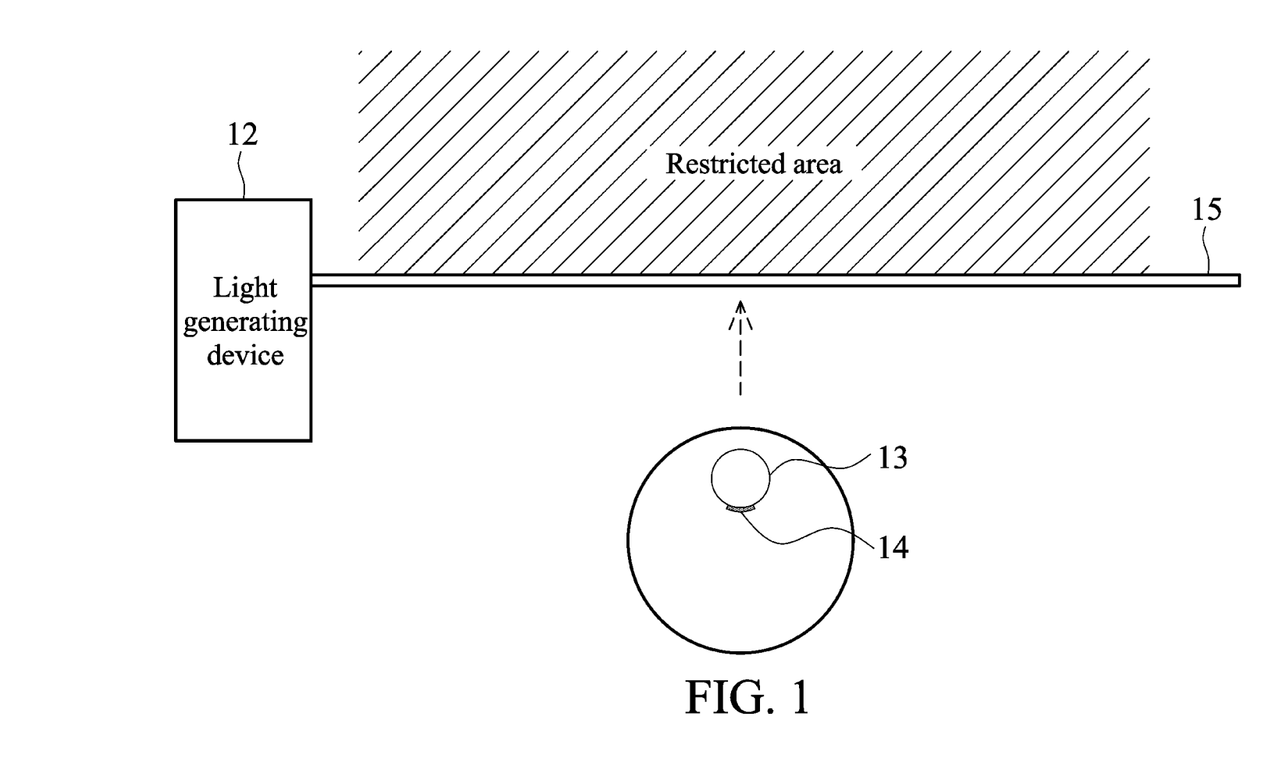
FIG. 1 is a schematic diagram of a light generating device and a cleaning robot according to an embodiment of the invention.

FIG. 1 is a schematic diagram of a light generating device and a cleaning robot according to an embodiment of the invention. The light generating device 12 outputs a light beam 15 to label a restricted area that the cleaning robot 11 cannot enter. The cleaning robot 11 comprises a non-omni light detector 13 having a rib (or called mask) 14, wherein the rib 14 produces a shadowed area on the non-omni light detector 13 by a predetermined angle and the range of the predetermined angle is from 30 degrees to 90 degrees.

The rib 14 may be fixed on the surface of the non-omni light detector 13 or movable along the non-omni light detector 13. The rib 14 can be spun in 360 degrees along the surface of the non-omni light detector 13. In this embodiment, the term, non-omni, is a functional description to describe that the rib 14 causes an area on the surface of the non-omni light detector 13 and the non-omni light detector 13 cannot not detect light therein or light to not directly reach that area.

Thus, the non-omni light detector 13 can be implemented in two ways. The first implementation is to combine an omni-light detector with a rib 14 and the rib 14 is fixed on a specific position of the surface of the omni-light detector. The non-omni light detector 13 is disposed on a plate that can be spun by a motor. Thus, the purpose of spinning of the non-omni light detector 13 can be achieved. When the non-omni light detector 13 detects the light beam, an incident angle of the light beam 15 can be determined by spinning the non-omni light detector 13.

Another implementation of the non-omni light detector 13 is implemented by telescoping a mask kit on an omni-light detector, wherein the omni light detector cannot be spun and the masking kit is movable along a predetermined track around the omni light detector. The mask kit is spun by a motor. When the non-omni light detector 13 detects the light beam 15, the mask kit is spun to determine the incident angle of the light beam 15.

Figure 2:
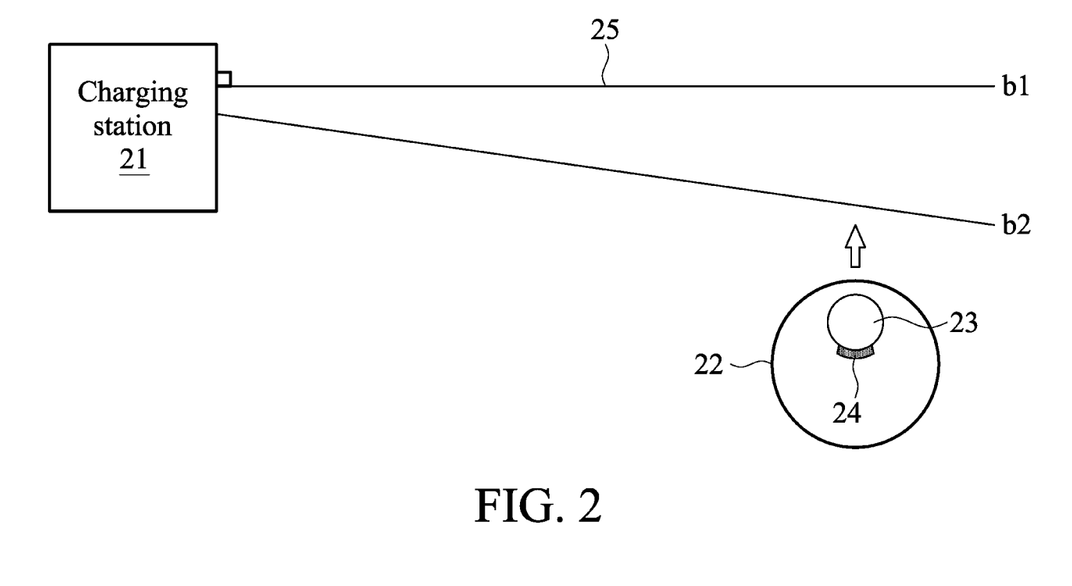
FIG. 2 is a schematic of a cleaning robot and a charging station according to an embodiment of the invention.

FIG. 2 is a schematic of a cleaning robot and a charging station according to an embodiment of the invention. The charging station 21 comprises an Infrared (IR) transmitter to output an IR light beam 25. The IR light beam 25 has a first encoding format or a first modulation format. The IR light beam 25 comprises a first boundary b1 and a second boundary b2, wherein the first boundary b1 is perpendicular or substantially perpendicular to the charging station 21. In one embodiment, the included angle between the first boundary b1 and the charging station 21 is less than 10 degrees. In this embodiment, the charging station 21 directs the cleaning robot 22 to move along the first boundary b1 to enter the charging station 21 for charging.

The IR light beam 25 is an encoded IR signal and IR light beam 25 carries information related to the charging station 21, such as the identification of the charging station 21. In one embodiment, the data carried by the IR light beam 25 comprises a first bit to indicate whether the first boundary b1 or the second boundary b2 is perpendicular or substantially perpendicular to the charging station 21. In other words, the first bit indicates that the cleaning robot 22 moves to the charging station 21 along the first boundary b1 or the second boundary b2.

Assuming the first boundary b1 of the IR light beam 25 is perpendicular to the charging station 21, the logic value of the first bit is 1, and assuming the second boundary b1 of the IR light beam 25 is perpendicular to the charging station 21, the logic value of the first bit is 0. In this embodiment, the first boundary b1 of the IR light beam 25 is perpendicular to the charging station 21 and the logic value of the first bit is 1.

When the cleaning robot 22 keeps moving forward, the non-omni light detector 23 detects the IR light beam 25. A controller of the cleaning robot 22 decodes the detected IR light beam 25 and determines that the logic value of the first bit is 1. Then, the non-omni light detector 23 is spun and the controller determines that the charging station 21 is located at the left side of the cleaning robot 23 by the help of the rib 24.

The controller of the cleaning robot 22 then determines that the cleaning robot 22 is currently moving from the second boundary b2 to the first boundary b1 according to the logic value of the first bit and the location of the charging station 21, and the cleaning robot 22 should move along the first boundary b1 to enter the charging station 21. When the non-omni light detector 23 does not detect the IR light beam 25, it means that the cleaning robot 22 has left the first boundary area. The cleaning robot 22 is then spun in the counter clockwise direction and when the non-omni light detector 23 detects the IR light beam 25, the cleaning robot is stopped from spinning.

When the non-omni light detector 23 detects the IR light beam 25, the rib 24 is disposed in front of the non-omni light detector 23 and the non-omni light detector 23 therefore cannot detect the IR light beam 25 from the charging station 21 because the IR light beam 25 is blocked by the rib 24. Thus, the cleaning robot 22 substantially moves straightforwardly to the charging station 21 along the first boundary b1 if the non-omni light detector 23 does not detect the IR light beam 25 during the movement of the cleaning robot 22.

When the non-omni light detector 23 detects the IR light beam 25 during the movement of the cleaning robot 22 to the charging station 21, the cleaning robot 22 stops and calibrates the moving direction of the cleaning robot 22 according to the detection result of the non-omni light detector 23.

When the cleaning robot 22 approaches to the charging station 21 and the distance between the cleaning robot 22 and the charging station 21 is less than a predetermined distance, a touch sensor outputs a stop signal to the controller of the cleaning robot 22. The touch sensor is disposed in the front end of the cleaning robot 22 to detect whether there is any obstacle in front of the cleaning robot 22. When the touch sensor detects an obstacle, the cleaning robot 22 first determines whether the obstacle is the charging station 21. If the obstacle is the charging station 21, the cleaning robot 22 stops moving and moves in another direction. If the obstacle is not the charging station 21, the cleaning robot 22 first leaves the original route to avoid the obstacle and returns to the original route after avoiding the obstacle.

In this embodiment, the charging station 21 comprises a wireless signal sensing device to sense the wireless signal output by the touch sensor of the cleaning robot 22. When a controller of the charging station 21 determines that the strength of the detected wireless signal is larger than a preset value, the charging station 21 changes the format of the IR light beam 25 to a second encoding format or a second modulation format. In other words, the charging station 21 can output at least two IR light beams with different encoding formats or modulation formats. Therefore, when the cleaning robot 22 determines that the format of the IR light beam is the second encoding format or the second modulation format, it means that the obstacle in front of the cleaning robot 22 is the charging station 21.

In another embodiment, the data carried by the IR light beam 25 comprises a second bit to indicate whether the cleaning robot 22 is near to the charging station. For example, if the value of the second bit is 0, it represents that the cleaning robot 22 is not near the charging station 21. If the value of the second bit is 1, it represents that the cleaning robot 22 is near the charging station 21. The cleaning robot 22 can continuously decode or demodulate the detected IR light beam to detect the logic level of the second bit to determine whether the cleaning robot 22 is near the charging station 21.

In another embodiment, when the cleaning robot 22 approaches to the charging station 21, the charging station 21 outputs a radio frequency (RF) signal, wireless signal or an infrared signal to let the cleaning robot 22 know that the cleaning robot 22 is close to the charging station 21. In another embodiment, Near Field Communication (NFC) devices are embedded in both the cleaning robot 22 and the charging station 21. When the NFC device of the cleaning robot 22 receives signals or data from the NFC device of the charging station 21, it means that the cleaning robot 22 is close to the charging station 22 and the cleaning robot 22 should stop accordingly. Generally speaking, the sensing distance of the NFC device is 20 cm.

Figure 3A:
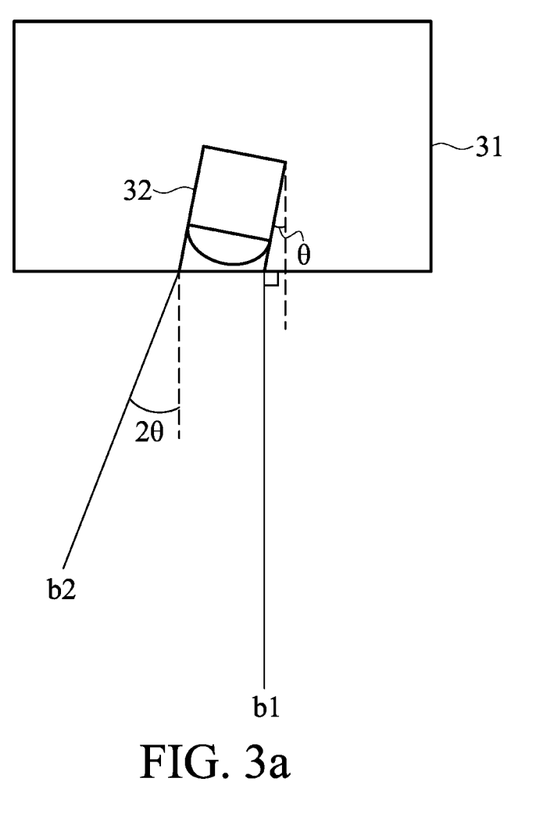
FIG. 3a is a schematic diagram of an embodiment of an IR transmitter of a charging station according to the invention.

FIG. 3a is a schematic diagram of an embodiment of an IR transmitter of a charging station according to the invention. The charging station 31 comprises an IR transmitter 32, wherein the IR transmitter 32 is offset for an angle θ when the IR transmitter 32 is assembled in the charging station 31. Thus, the first boundary b1 of the IR light beam output by the IR transmitter 32 is substantially perpendicular to the charging station 31. In this embodiment, the IR light beam output by the IR transmitter 32 has a scattering angle 2θ, thus, the IR transmitter 32 has to be offset for the angle θ and the first boundary b1 of the IR light beam is substantially perpendicular to the charging station 31 accordingly. Moreover, an included angle between the second boundary b2 and the charging station 31 is 2θ.

In FIG. 2, the first boundary b1 of the IR light beam is perpendicular to the charging station 21 and the charging station 21 guides the cleaning robot 22 to enter the charging station 21 along the first boundary b1. Similarly, the light generating device 12 in FIG. 1 can select one boundary of the light beam 15 to be perpendicular to the light generating device 12 and guides the cleaning robot to move to or move away from the light generating device 12.

Figure 3B:
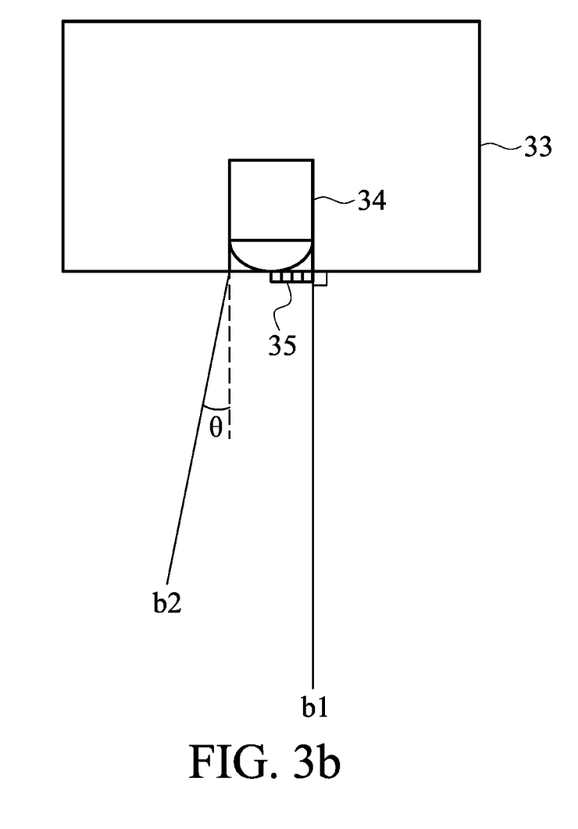
FIG. 3b is a schematic diagram of another embodiment of an IR transmitter of a charging station according to the invention.

FIG. 3b is a schematic diagram of another embodiment of an IR transmitter of a charging station according to the invention. The charging station 33 comprises an IR transmitter 34 and a parallel light guide plate 35. The parallel light guide plate 35 is disposed in the front of the IR transmitter 34. In this embodiment, the parallel light guide plate 35 covers only half the area of the IR transmitter 34. The parallel light guide plate 35 transforms the lights emitted by the IR transmitter 34 into parallel lights. Thus, the first boundary b1 is substantially perpendicular to the parallel light guide plate 35. Moreover, an included angle between the second boundary b2 and the charging station 31 is θ.

The light beam output by the IR transmitter of the charging station shown in FIG. 3a or FIG. 3b contains other information to inform the cleaning robot to move to the charging station along the first boundary b1 or the second boundary b2. Although first boundary b1 of the light beam output by the charging station shown in FIG. 3a or FIG. 3b is substantially perpendicular to the charging station, but not limit the invention thereto. An included angle between the first boundary b1 and the charging station is acceptable if the included angle ranges from −10 degrees to 10 degrees.

Figure 4:
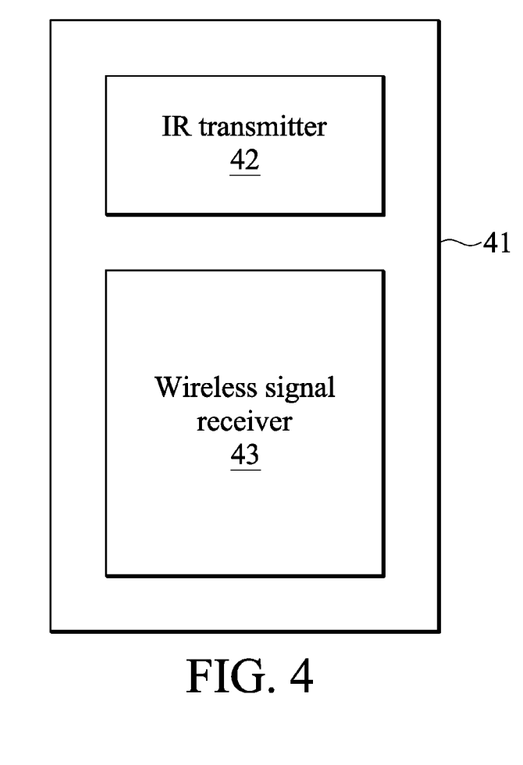
FIG. 4 is a schematic diagram of an embodiment of a charging station according to an embodiment of the invention.

FIG. 4 is a schematic diagram of an embodiment of a charging station according to an embodiment of the invention. The charging station 41 comprises an IR transmitter 42 and a wireless signal receiver 43. The IR transmitter 42 outputs an IR signal with a first encoding format or a first modulation format to guide a cleaning robot to enter the charging station 41 for charging. The wireless signal receiver 43 may be an IR signal receiver or an acoustic signal receiver. In one embodiment, a reflect mirror is disposed on the front terminal of the cleaning robot, and when the cleaning robot approaches the charging station 41, the reflect mirror reflects the IR signal output by the IR transmitter 42 to the wireless signal receiver 43. A controller of the charging station detects and determines whether the signal received by the wireless signal receiver 43 is the IR signal output by the IR transmitter 42. When the received signal is output by the IR transmitter 42 and the strength of the received signal is larger than a predetermined value, the cleaning robot is near to the charging station 41.

In another embodiment, the cleaning robot comprises a first IR signal transmitter to output a first IR signal, wherein the first IR signal contains the information of the cleaning robot, such as the model of the cleaning robot and the charging voltage value of the cleaning robot. When the wireless signal receiver 43 receives the first IR signal and the strength of the first IR signal is larger than a predetermined value, it means that the cleaning robot is near to the charging station 41. The IR transmitter 42 may output the IR signal with a second encoding format or a second modulation format to inform the cleaning robot that the cleaning robot is near to the charging station 41 and should prepare a boarding procedure for charging the cleaning robot.

In another embodiment, the wireless signal receiver 43 is an acoustic signal receiver and an ultrasonic signal transmitter is disposed in the front end of the cleaning robot. When the wireless signal receiver 43 receives the ultrasonic signal output by the cleaning robot and the strength of the ultrasonic signal is larger than a predetermined value, it means that the cleaning robot is near to the charging station 41. The IR transmitter 42 may output the IR signal with a second encoding format or a second modulation format to inform the cleaning robot that the cleaning robot is near to the charging station 41 and should prepare a boarding procedure for charging the cleaning robot.

In another embodiment, the wireless signal receiver 43 is a magnetic signal receiver and a magnetic signal transmitter is embedded in the cleaning robot. The magnetic signal receiver receives a magnetic signal output by the magnetic signal transmitter. When the strength of the magnetic signal is larger than a predetermined value, it means that the cleaning robot is near to the charging station 41. The IR transmitter 42 may output the IR signal with a second encoding format or a second modulation format to inform the cleaning robot that the cleaning robot is near to the charging station 41 and should prepare a boarding procedure for charging the cleaning robot.

In this embodiment, the IR transmitter 42 first outputs the IR signal with a first encoding format or a first modulation format to direct the cleaning robot entering the charging station 41. When a distance between the cleaning robot and the charging station 41 is less than a predetermined distance, such as 30 cm, the IR transmitter 42 outputs the IR signal with the second encoding format or the second modulation format to inform the cleaning robot that the cleaning robot is near to the charging station 41 and should prepare a boarding procedure for charging the cleaning robot.

Figure 5:
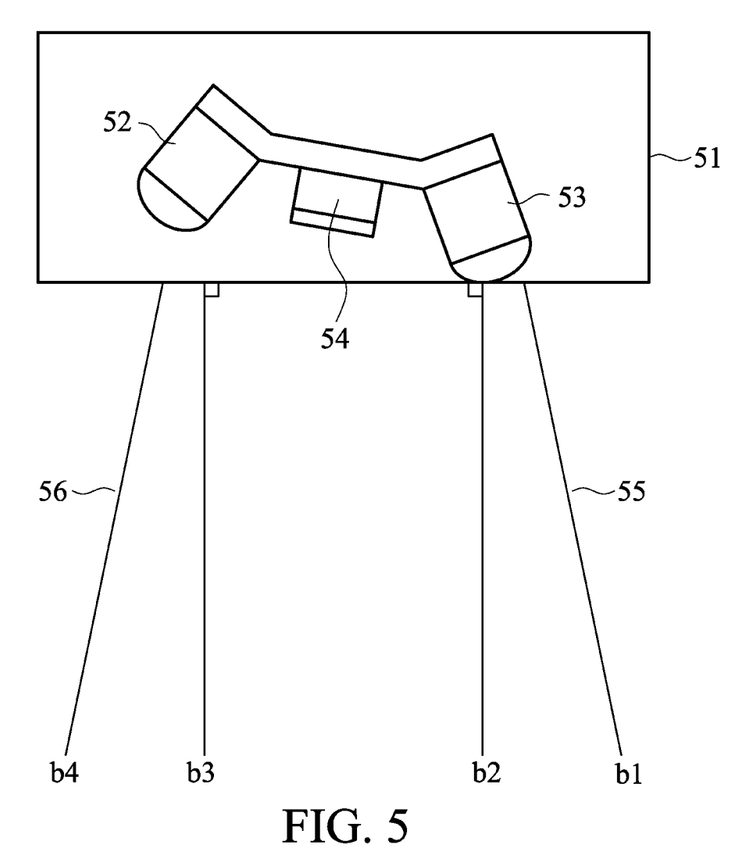
FIG. 5 is a schematic diagram of a charging station according to another embodiment of the invention.

FIG. 5 is a schematic diagram of a charging station according to another embodiment of the invention. The charging station 51 comprises a first IR transmitter 52, a second IR transmitter 53 and a wireless signal transceiver 54. The first IR transmitter 52 outputs a first IR light beam 56, wherein the boundary b3 of the first IR light beam 56 is substantially perpendicular to the charging station 51. The second IR transmitter 53 outputs a second IR light beam 55, wherein the boundary b2 of the second IR light beam 55 is substantially perpendicular to the charging station 51. The first IR light beam 56 and the second IR light beam 55 are IR signals with a first encoding format.

In this embodiment, the boundaries b3 and b2 are substantially perpendicular to the charging station 51, but the invention is not limited thereto. In another embodiment, the boundaries b3 and b2 are not perpendicular to the charging station 51, and the controller of the charging station 51 transmits information to the cleaning robot via the first IR light beam 56 and the second IR light beam 55. When the cleaning robot receives the information, the cleaning robot moves between the boundaries b3 and b2 when moving to the charging station 51. In other embodiment, the IR signal with the first encoding format contains the information of the boundaries b3 and b2.

The cleaning robot comprises a light detector to detect the first IR light beam 56 and the second IR light beam 55. The charging station 51 directs the cleaning robot to move the charging station 51 in the area within the boundaries b3 and b2. The wireless signal transceiver 54 outputs a wireless signal and when the cleaning robot approaches the charging station 51, the cleaning robot reflects the wireless signal to the wireless signal transceiver 54. Thus, when the wireless signal transceiver 54 determines the strength of the wireless signal is larger than a predetermined value, it represents that the cleaning robot is near the charging station 51. The first IR transmitter 52 outputs the first IR light beam 56 with the second encoding format and the second IR transmitter 53 outputs the second IR light beam 55 with the second encoding format to inform the cleaning robot that the cleaning robot is near to the charging station 51.

In another embodiment, the wireless signal transceiver 54 is an IR transceiver. The cleaning robot comprises a third IR transmitter to output a third IR signal, wherein the third IR signal contains information of the cleaning robot, such as the model of the cleaning robot and the charging voltage value of the cleaning robot. When the wireless signal transceiver 54 receives the third IR signal and the strength of the third IR signal is larger than a predetermined value, it means that the cleaning robot is near to the charging station 51. The first IR transmitter 52 outputs the first IR light beam 56 with the second encoding format and the second IR transmitter 53 outputs the second IR light beam 55 with the second encoding format to inform the cleaning robot that the cleaning robot is near to the charging station 51 and should prepare a boarding procedure for charging the cleaning robot.

In another embodiment, the cleaning robot comprises a magnetic signal transmitter and a magnetic signal receiver is embedded in the charging station 51 or the wireless signal transceiver 54 is the magnetic signal receiver. The magnetic signal receiver receives a magnetic signal output by the magnetic signal transmitter. When the strength of the magnetic signal is larger than a predetermined value, it means that the cleaning robot is near to the charging station 51. The first IR transmitter 52 outputs the first IR light beam 56 with the second encoding format and the second IR transmitter 53 outputs the second IR light beam 55 with the second encoding format to inform the cleaning robot that the cleaning robot is near to the charging station 51 and should prepare a boarding procedure for charging the cleaning robot.

Figure 6:
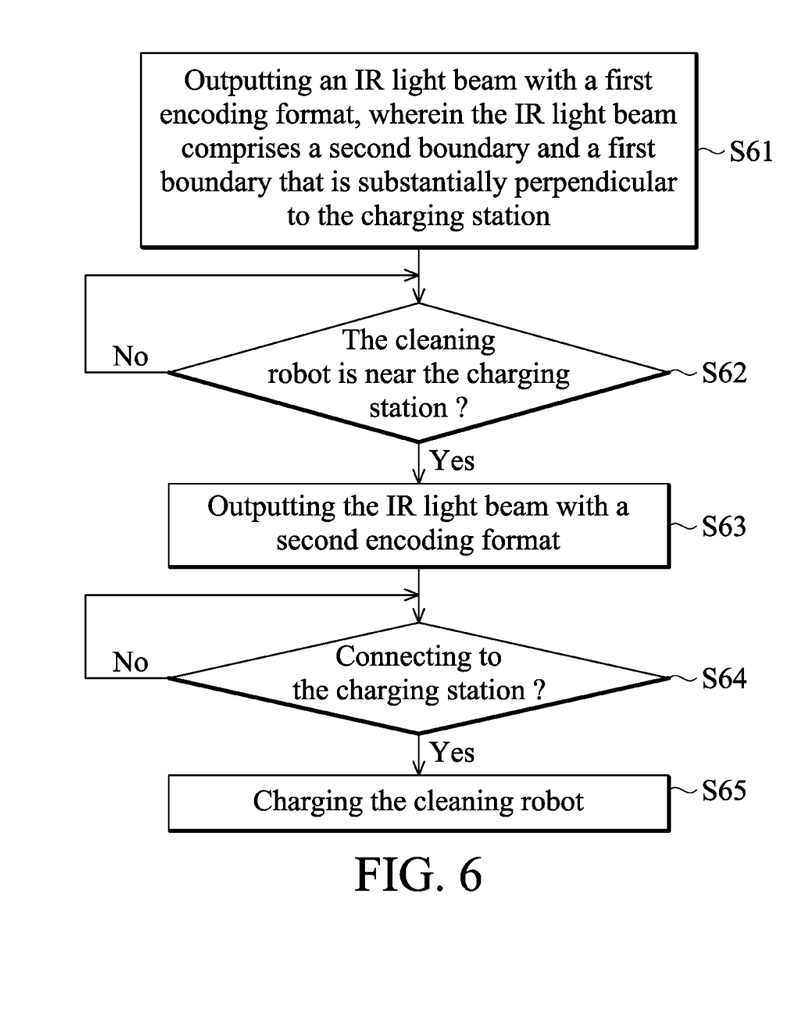
FIG. 6 is a flowchart of an operation method of a charging station according to an embodiment of the invention.

FIG. 6 is a flowchart of an operation method of a charging station according to an embodiment of the invention. In the step S61, the IR transmitter of the charging station outputs an IR light beam with a first encoding format, wherein the IR light beam comprises a second boundary and a first boundary that is substantially perpendicular to the charging station. The charging station directs the cleaning robot to enter the charging station along the first boundary.

In the step S62, a controller of the charging determines whether the cleaning robot is near the charging station. If not, step S62 remains to be executed. If yes, step S63 is executed. In the step S63, the IR transmitter of the charging station outputs the IR light beam with a second encoding format to inform the cleaning robot that the cleaning robot is near to the charging station and should prepare a boarding procedure for charging the cleaning robot.

In the step S64, the controller of the cleaning robot determines whether the cleaning robot connects to a charging port of the charging station. If yes, step S65 is executed, and the charging station charges the cleaning robot. If the cleaning robot does not connect to the charging port of the charging station, the controller of the charging station continuously monitors the state of the charging port to determine whether the cleaning robot connects to the charging port.

Figure 7:
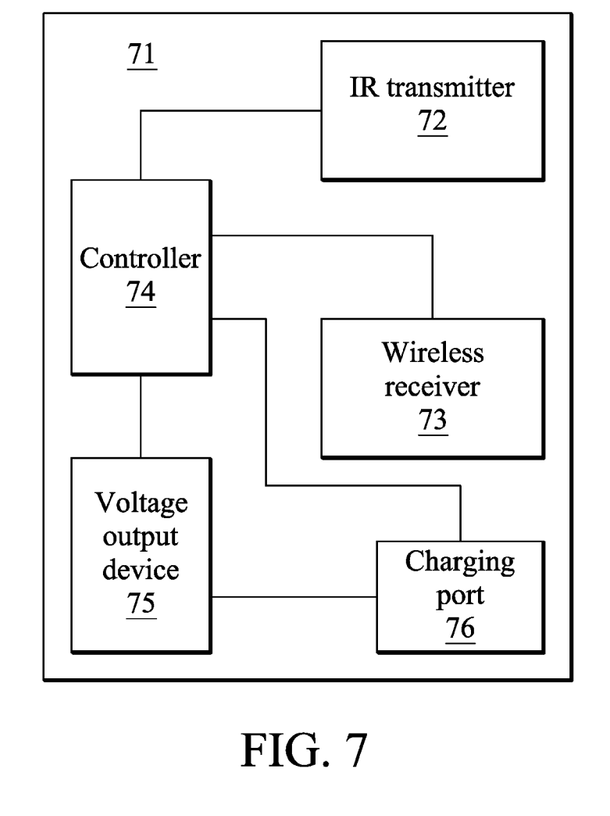
FIG. 7 is a functional block diagram of an embodiment of a charging station according to the invention.

FIG. 7 is a functional block diagram of an embodiment of a charging station according to the invention. The charging station 71 comprises an IR transmitter 72, a wireless receiver 73, a controller 74, a voltage output device 75 and a charging port 76. The IR transmitter 72 is controlled by the controller 74 and output a first IR light beam with a first encoding format, wherein the IR light beam comprises a second boundary and a first boundary that is substantially perpendicular to the charging station. The charging port 76 is coupled to the controller 74 and when the cleaning robot is electrically connected to the charging port 76, the charging port 76 transmits a trigger signal to the controller 74. Then, the controller 74 controls the voltage output device 75 to charge the cleaning robot. The charging station 71 further connects to the Internet and transmits data received from the Internet to the cleaning robot. The charging station 71 connects to the Internet via wired or wireless mechanism to transmit and/or receive data from the Internet, and transmits the data to the cleaning robot. In one embodiment, the data is transmitted by a user via a portable device to control the operation of the cleaning robot.

In one embodiment, the wireless receiver 73 is an IR signal receiver. The cleaning robot comprises a third IR signal transmitter to output a third IR signal, wherein the third IR signal contains the information of the cleaning robot, such as the model of the cleaning robot and the charging voltage value of the cleaning robot. When the wireless signal receiver 73 receives the third IR signal and the strength of the third IR signal is larger than a predetermined value, it means that the cleaning robot is near to the charging station 71. The wireless signal receiver 73 transmits a first signal to the controller 74. The controller 74 then controls the IR transmitter 72 to output the first IR light beam with a second encoding format to inform the cleaning robot that the cleaning robot is near to the charging station 71 and should prepare a boarding procedure for charging the cleaning robot.

In another embodiment, the wireless signal receiver 73 is an acoustic signal receiver and an ultrasonic signal transmitter is disposed in the front end of the cleaning robot. When the wireless signal receiver 73 receives the ultrasonic signal output by the cleaning robot and the strength of the ultrasonic signal is larger than a predetermined value, it means that the cleaning robot is near to the charging station 71. The wireless signal receiver 73 transmits a first signal to the controller 74. The controller 74 controls the IR transmitter 72 to output the first IR light beam with a second encoding format to inform the cleaning robot that the cleaning robot is near to the charging station 71 and should prepare a boarding procedure for charging the cleaning robot.

When the cleaning robot enters in the charging station and electrically connects to the charging port 76, the controller 74 controls the voltage output device 75 to output a voltage to the charging port 76 according to the charging voltage of the cleaning robot. In another embodiment, the charging station 71 electrically connects to the cleaning robot via a non-contact charging mechanism. In another embodiment, the controller 74 adjusts the magnitude of the output voltage and the output current of the voltage output device 75 to properly charge the cleaning robot according to an identification information of the cleaning robot. In another embodiment, the charging port 76 is a part of a non-contact charging device and when the controller 74 receives an identification information from the cleaning robot, the identification information activates a non-contact charging operation. Furthermore, the controller 74 executes a handshaking operation to connect to the network according to the identification information.

In another embodiment, after the cleaning robot electrically connects to the charging port 76, the cleaning robot transmits the identification information to the controller 74 via the charging port 76. Furthermore, the cleaning robot transmits a power state of the cleaning robot to the controller 74 and the controller 74 selects a corresponding charging mode, such as a fast charging mode and a normal charging mode, according to the identification information. The fast charging mode means that the voltage output device 75 charges the cleaning robot with a larger current and the normal charging mode means that the voltage output device 75 charges the cleaning robot with a constant voltage.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charging station for a cleaning robot, comprising:
an infrared (IR) transmitter to output a first IR light beam with a scattering angle 2θ, wherein the IR light beam comprises a second boundary and a first boundary, and the IR transmitter is offset at the angle θ to make the first boundary is substantially perpendicular or perpendicular to the charging station and the cleaning robot moves to the charging station along the first boundary; and
a controller to control the IR transmitter, wherein when the controller determines that the cleaning robot is near to the charging station, the controller controls the IR transmitter to output a second IR light beam.

2. The charging station as claimed in claim 1, further comprising:
a wireless signal sensor to detect a wireless signal, wherein when the wireless signal sensor detects the wireless signal and a strength of the wireless signal is larger than a predetermined value, the wireless signal sensor transmits a first signal to the controller and the controller controls the IR transmitter to output the second IR light beam according to the first signal.

3. The charging station as claimed in claim 1, further comprising:
an acoustic signal receiver to receive an acoustic signal output by the cleaning robot, wherein when a strength of the acoustic signal is larger than a predetermined value, the acoustic signal receiver transmits a first signal to the controller and the controller controls the IR transmitter to output the second IR light beam according to the first signal.

4. The charging station as claimed in claim 1, further comprising:
an IR receiver coupled to the controller, wherein when the IR receiver receives the first IR light beam and a strength of the first IR light beam is larger than a predetermined value, the IR receiver transmits a first signal to the controller and the controller controls the IR transmitter to output the second IR light beam according to the first signal.

5. The charging station as claimed in claim 1, further comprising:
a voltage output device coupled to the controller to output an output voltage to the cleaning robot, wherein the controller adjusts the voltage level of the output voltage according to an identification information of the cleaning robot.

6. The charging station as claimed in claim 5, further comprising:
a charging port to electrically connect to the cleaning robot, wherein when the charging port is electrically connected to the cleaning robot, the controller receives a trigger signal and controls the voltage output device to charge the cleaning robot.

7. A charging system, comprising:
a charging station, comprising:
an infrared (IR) transmitter to output a first IR light beam with a scattering angle 2θ, wherein the IR light beam comprises a second boundary and a first boundary, and the IR transmitter is offset at the angle θ to make the first boundary is substantially perpendicular or perpendicular to the charging station; and
a controller to control the IR transmitter to output the first IR light beam or a second IR light beam; and
a cleaning robot comprising a light detector to detect the first IR light beam or the second IR light beam, wherein when the light detector detects the first IR light beam or the second IR light beam, the cleaning robot moves to the charging station along the first boundary.

8. The charging system as claimed in claim 7, wherein the charging station further comprises a wireless signal sensor for detecting a wireless signal output by the cleaning robot, and when the wireless signal sensor detects the wireless signal and a strength of the wireless signal is larger than a predetermined value, the wireless signal sensor transmits a first signal to the controller and the controller controls the IR transmitter to output the second IR light beam according to the first signal.

9. The charging system as claimed in claim 7, wherein the charging station further comprises an acoustic signal receiver to receive an acoustic signal output by the cleaning robot, and when a strength of the acoustic signal is larger than a predetermined value, the acoustic signal receiver transmits a first signal to the controller and the controller controls the IR transmitter to output the second IR light beam according to the first signal.

10. The charging system as claimed in claim 7, wherein the charging station further comprises a magnetic signal receiver to receiving a magnetic signal output by the cleaning robot and when a strength of the magnetic signal is larger than a predetermined value, the magnetic signal receiver transmits a first signal to the controller and the controller controls the IR transmitter to output the second IR light beam according to the first signal.

11. The charging system as claimed in claim 7, wherein the charging station further comprises an IR receiver coupled to the controller and when the IR receiver receives the first IR light beam and a strength of the first IR light beam is larger than a predetermined value, the IR signal receiver transmits a first signal to the controller and the controller controls the IR transmitter to output the second IR light beam according to the first signal.

12. The charging system as claimed in claim 7, wherein the charging station further comprises a voltage output device coupled to the controller to output an output voltage to the cleaning robot, and the controller adjusts the voltage level of the output voltage according to an identification information of the cleaning robot.

13. The charging system as claimed in claim 12, wherein the charging station further comprises a charging port to electrically connect to the cleaning robot, and when the charging port is electrically connected to the cleaning robot, the controller receives a trigger signal and controls the voltage output device to charge the cleaning robot.

14. The charging system as claimed in claim 12, wherein the charging station further comprises a charging port to electrically connect to the cleaning robot, when the charging port is electrically connected to the cleaning robot, the controller receives a trigger signal and controls the voltage output device to charge the cleaning robot, the charging station further connects to a network to transmit and receive data from the network and the received data is transmitted to the cleaning robot.

15. The charging system as claimed in claim 7, wherein when the cleaning robot is electrically connected to a charging port of the charging station, the cleaning robot transmits identification information to the controller.

16. The charging system as claimed in claim 15, wherein when the charging station is a non-contact charging device, the identification information activates a non-contact charging operation and a handshaking operation to handshake network data.

\* \* \* \* \*